United States Patent [19]

Pinto

[11] Patent Number: 4,778,670
[45] Date of Patent: Oct. 18, 1988

[54] TECHNICAL HYDROGEN

[75] Inventor: Alwyn Pinto, Middlesbrough, United Kingdom

[73] Assignee: Imperial Chemical Industries PLC, London, England

[21] Appl. No.: 868,666

[22] Filed: May 30, 1986

Related U.S. Application Data

[63] Continuation-in-part of Ser. No. 703,531, Feb. 20, 1985, Pat. No. 4,695,442.

[30] Foreign Application Priority Data

| Mar. 2, 1984 [GB] | United Kingdom | 8405591 |
| Jul. 4, 1984 [GB] | United Kingdom | 8417016 |
| Jul. 4, 1984 [GB] | United Kingdom | 8417017 |
| Oct. 9, 1984 [GB] | United Kingdom | 8425508 |
| Jun. 4, 1985 [GB] | United Kingdom | 8513997 |

[51] Int. Cl.$^4$ .............................................. C01B 1/13
[52] U.S. Cl. .................................. 423/650; 55/25; 55/68; 423/652; 423/653
[58] Field of Search ................. 423/650, 652, 653; 55/25, 68

[56] References Cited

U.S. PATENT DOCUMENTS

| 4,264,567 | 4/1981 | Pinto | 423/359 |
| 4,325,931 | 4/1982 | Lewis | 423/363 |
| 4,512,780 | 4/1985 | Fuderer | 55/26 |
| 4,553,981 | 11/1985 | Fuderer | 423/359 |
| 4,592,860 | 6/1986 | Fuderer | 252/376 |
| 4,695,442 | 9/1987 | Pinto et al. | 55/25 |

Primary Examiner—John Doll
Assistant Examiner—Wayne A. Langel
Attorney, Agent, or Firm—Cushman, Darby & Cushman

[57] ABSTRACT

A PSA based process for the production of technical hydrogen wherein the feed to the PSA contains nitrogen and carbon monoxide with a hydrogen/(carbon monoxide+nitrogen) volume ratio in the range 1.2 to 4 and a nitrogen/carbon monoxide volume ratio of at least 10. The adsorption step in the PSA stage is stopped when the integrated nitrogen content of the unadsorbed product is 1 to 10% volume.

The raw gas fed to the PSA is preferably made by primary reforming a hydrocarbon feedstock with steam followed by secondary reforming followed by shift and water removal: the heat required for primary reforming is preferably supplied by the secondary reformer outlet gas.

The PSA waste gas is preferably combusted in a gas turbine driving the secondary reformer air compressor.

9 Claims, 1 Drawing Sheet

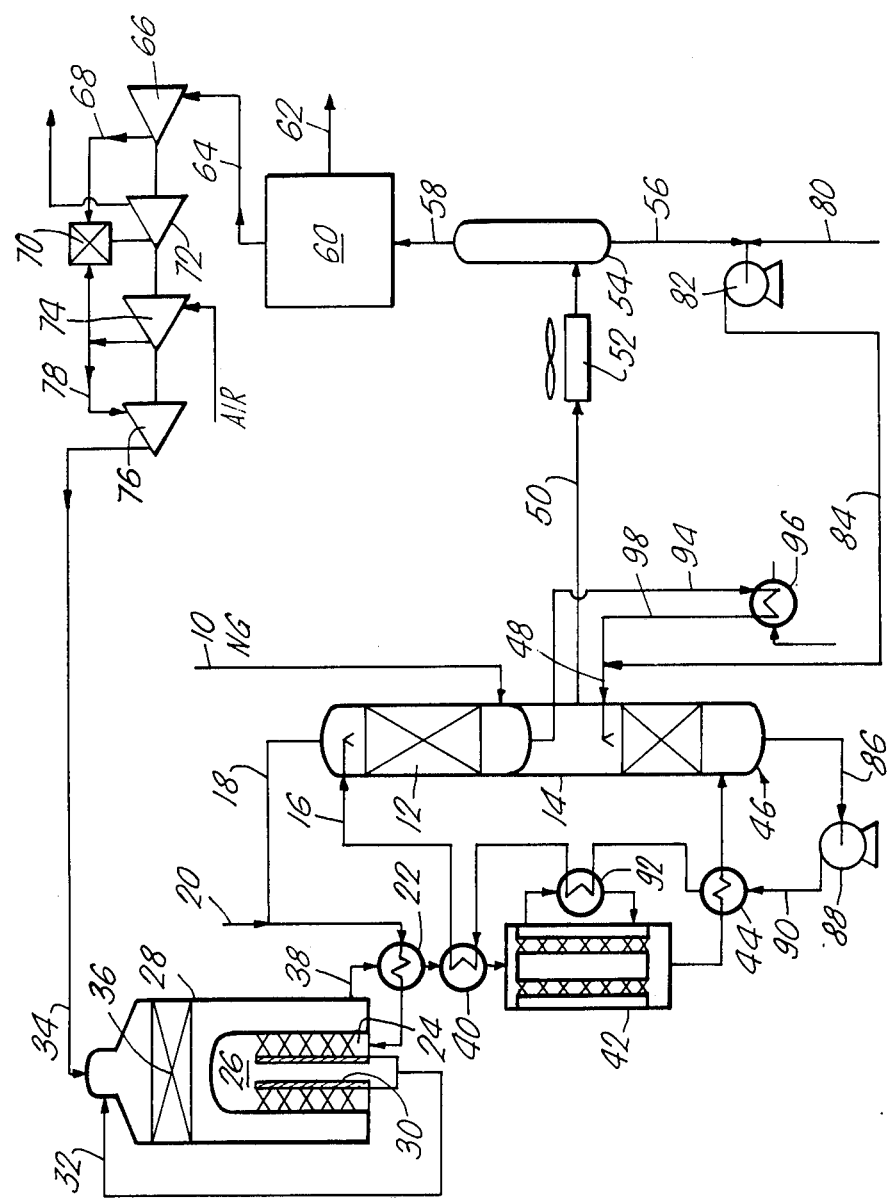

TECHNICAL HYDROGEN

This is a continuation-in-part of application Ser. No. 703,531 filed Feb. 20, 1985 now U.S. Pat. No. 4,695,442.

This invention relates to technical hydrogen, that is, to a gas containing at least 90% by volume of hydrogen along with non-reactive impurities, and to a process for producing it.

Such a gas is commonly made by reacting a hydrocarbon feedstock with steam over a catalyst heated externally in a reformer furnace, then subjecting the resultant crude gas, which contains hydrogen, carbon oxides, steam, and methane, to the catalytic shift reaction to convert carbon monoxide to carbon dioxide, with the consequent production of more hydrogen, followed by steam removal, carbon dioxide removal by a "wet" process, and methanation to convert residual carbon oxides to methane (which is generally an acceptable inert impurity in technical hydrogen).

In another common method the crude gas is made by reacting the hydrocarbon feedstock with oxygen.

It has been proposed to simplify such process sequences by substituting a pressure swing adsorption (PSA) stage for at least part of the wet carbon dioxide removal and methanation stages, but the resulting process is only applicable in practice when highly pure hydrogen is required, because operation of the PSA stage to produce less pure hydrogen would lead to a content of carbon monoxide unacceptable to most users. The result of producing such highly pure hydrogen is that the hydrogen recovery, i.e. the ratio of the amount of hydrogen in the technical hydrogen product stream to the amount of hydrogen in the raw gas fed to the PSA stage, is low. In view also of the high cost of the reforming furnace, or of the air separation plant required to produce oxygen, there is evidently a need for further improvement of PSA-based processes.

We have now realised that if the raw gas fed to the PSA stage contains sufficient nitrogen in relation to carbon monoxide, a medium purity technical hydrogen product can be obtained with an acceptably low carbon monoxide content with a high hydrogen recovery. The product will contain nitrogen as an impurity; however for most applications this is acceptable. Also the raw gas can be made without using either a fired reformer furnace or an air separation plant and the product can be at a higher pressure than in processes based on the use of a fired reformer furnace. Furthermore, although the PSA waste gas is of lower calorific value than in the previous processes producing high purity hydrogen, the fuel value of the waste gas can be recovered by way of catalytic combustion.

Accordingly the present invention provides a pressure swing adsorption (PSA) process for producing a technical hydrogen stream comprising
(a) feeding to the PSA adsorbent a raw gas containing hydrogen, nitrogen, and carbon oxides, wherein the volume ratio of hydrogen to the sum of nitrogen and carbon monoxide is in the range 1.2 to 4.0 and the nitrogen content by volume is at least ten times the carbon monoxide content, and
(b) stopping the adsorption step in the PSA cycle when the integrated nitrogen content of the unadsorbed product gas of the PSA stage is in the range 1 to 10% by volume.

The adsorption step is preferably stopped when the integrated nitrogen content of the unadsorbed product is at least 2% by volume.

The invention is illustrated by the accompanying drawing, which is a flow sheet of a combination process including initial reaction of a hydrocarbon feedstock with steam and air, shift with heat recovery, PSA separation of the raw gas to give a technical hydrogen product stream and a waste gas by way of catalytic combustion.

The raw gas fed to the PSA stage may contain up to a few per cent of water vapour by volume, depending on the ability of the PSA stage to handle it, for example as a result of including a silica gel water adsorption section. Generally however the water vapour content of the raw gas should be under 1% by volume.

The volume ratio of hydrogen to the sum of nitrogen and carbon monoxide in the raw gas is preferably in the range 1.4 to 3.0. The nitrogen to carbon monoxide volume ratio is preferably at least 20, and may be as high as 200. Still higher ratios could be used, but it is more costly to attain them. The carbon monoxide content is typically under 4, especially under 1, more especially under 0.5, % by volume on a dry basis. These carbon monoxide contents will of course correspond to the extent to which the raw gas has been subjected to the shift reaction, as will be described hereinafter.

By the process of the invention it is readily practicable to obtain a hydrogen product stream having a carbon monoxide content under 200, especially under 100, ppm by volume.

The raw gas may, and generally will, contain methane; however the proportion thereof is preferably under 2% by volume on a dry basis, since higher levels represent non-utilised feedstock and lead to a waste gas calorific value unnecessarily high for an energy balanced process.

Where the nitrogen in the raw gas results from the use of air in the production of the raw gas, the latter will also contain inert gases such as argon. Some or all of the methane and such inert gases will be removed in the PSA stage but anyway their presence as impurities in the technical hydrogen product can normally be tolerated.

The raw gas will normally also contain carbon dioxide in addition to carbon monoxide. The amount of carbon dioxide in the raw gas is typically in the range 10 to 25% by volume on a dry basis. The volume ratio of the sum of nitrogen and carbon monoxide to carbon dioxide is suitably in the range 0.6 to 4.0, especially 0.75 to 2.25. The carbon dioxide will be essentially totally removed in the PSA stage.

The PSA system can broadly be of the types described in U.S. Pat. Nos. 3,430,418, 3,564,816, 3,986,849, EP-A-No. 157480, EP-A-No. 178833, and European Application No. 85307169.4 (which is to be published on 4 June 1986 as EP-A-No. 183358) and which corresponds to U.S. Ser. No. 786008. In the PSA system it is preferred that each bed takes part successively in the steps of:
  adsorption
  co-current pressure equalisation (preferably multiple)
  co-current partial depressurisation (optional)
  counter-current depressurisation
  purge (optional)
  re-pressurisation.

In the PSA system at least 4 beds are preferably used. In particular there are preferably at least 5 beds in order to provide for multiple pressure equalisations and thus increase the hydrogen product recovery. More preferably at least 10 beds are used.

In the ensuing definition of the special characteristics of the preferred PSA stage, the terms "inlet" and "outlet" refer to the direction of flow of gas during the adsorption step, and the terms "counter-current" and "co-current" mean towards such inlet and outlet respectively.

The preferred PSA stage differs from those previously proposed in the compositions of the raw and product gases and in the detailed operations appropriate thereto.

In the preferred PSA system the pressure of the raw gas entering a bed undergoing adsorption duty is preferably in the range 25 to 50, especially 30 to 40, bar abs.

In the adsorption step the raw gas is fed to the inlet of the bed in question and product gas is taken from the bed outlet. Within the bed during this step, gases more readily adsorbed than hydrogen are adsorbed onto the adsorbent. The most readily adsorbed components, water vapour and carbon dioxide, will be adsorbed in that portion of the bed nearest the inlet until the adsorbent is saturated with these components whereupon the adsorption front moves towards the bed outlet. The adsorption step is terminated before the carbon dioxide adsorption front reaches the bed outlet. Components of intermediate adsorbability, viz methane, nitrogen, carbon monoxide, and argon, are also adsorbed in the bed but their adsorption fronts will generally be nearer to the bed outlet than those of carbon dioxide and water vapour.

In the process of the invention the adsorption step is continued until the nitrogen adsorption front has reached the outlet of the bed, i.e. so that nitrogen "break-through" occurs; in this way the composition of the unadsorbed product varies significantly with time. Integrated over the whole of the adsorption step, the unadsorbed product has a hydrogen content of 90 to 99% by volume. In contrast, in conventional PSA processes used for the production of technical hydrogen, the unadsorbed product contains typically over 99.99% by volume of hydrogen and there is essentially no variation in the composition of the unadsorbed product during the adsorption step. In the present invention, the hydrogen content of the unadsorbed product is often relatively low at the start of the adsorption step because, in the preferred mode of operation, the bed has previously been purged counter-currently with a nitrogen-containing gas and repressurised counter-currently with the product gas stream and thus carries a relatively high loading of nitrogen at its outlet end: on commencement of adsorption, this nitrogen at the outlet end of the bed is swept into the unadsorbed product stream. On continuing adsorption the unadsorbed product becomes essentially only hydrogen until nitrogen break-through occurs. This nitrogen break-through is allowed to continue until the nitrogen content of the unadsorbed product, integrated over the whole of the adsorption step, is at the desired level.

In order to even out the composition of the unadsorbed product, it is preferred to use a buffer vessel into which the unadsorbed product is fed, and/or to use a PSA system having a plurality of beds on adsorption duty at any one time but out of phase with one another.

At the end of the adsorption step the bed contains three zones:

(a) a zone containing mainly carbon dioxide as adsorbate;
(b) a zone containing some carbon dioxide but partly loaded with carbon monoxide and nitrogen (and with methane and argon if these are present in the raw gas);
(c) a zone containing very little carbon dioxide but loaded with carbon monoxide and nitrogen at a level decreasing from the zone boundary towards the bed outlet.

Zone (c) may also contain methane and argon if these are present in the raw gas. The main function of this zone is to remove carbon monoxide (and methane if present) substantially totally and to remove most of the nitrogen (and some of the argon if present) so that the unadsorbed product, integrated over the adsorption step, has the desired purity. If methane is present in the gas leaving zone (b), it is removed essentially totally in zone (c). At the end of the adsorption step, zone (c) is still long enough to remain within the bed, i.e. so that essentially no carbon monoxide, or methane, leaves the bed, during a subsequent co-current flow pressure equalisation and co-current depressurisation providing a purge gas.

In the preferred PSA system, after the adsorption step has proceeded to the desired extent in a particular bed, the pressure in that bed is reduced by one or more pressure equalisation steps in which gas from the outlet of the bed that has finished its adsorption duty is released co-currently through the bed outlet and is fed, preferably counter-currently, into a recipient bed that has been depressurised and may have been partly repressurised. This allows unadsorbed gas that is still within the adsorber, at the end of the adsorption step, as void space gas and is at the adsorption pressure, to be recovered. This pressure equalisation step causes the adsorption fronts of all three zones (a), (b), and (c) to move towards the bed outlet but, as mentioned above, zone (c) remains substantial in length.

There may be one or more pressure equalisation steps as described in the aforementioned references.

After the pressure equalisation step, or steps, the bed is subjected to depressurisation. Where there is a purge step in the PSA cycle, this depressurisation may first be co-current to an intermediate pressure level to provide a purge stream for feeding to another bed, and in this case the co-current depressurisation may be between pressure equalisation steps. Such a co-current depressurisation further advances the main fronts of all three zones, and also a tail of each zone, towards the outlet of the bed, but zone (c) remains substantial in length, so that the gas leaving the outlet is carbon dioxide free. However the gas leaving the outlet during such a co-current depressurisation is relatively rich in nitrogen, since the hydrogen in the adsorber at the end of the adsorption cycle has largely been transferred to another bed during the pressure equalisation step, or steps, and nitrogen in zone (c) is desorbed as a result of the reduction in pressure and displacement by the advance of carbon dioxide.

After pressure equalisation and after any co-current depressurisation, the bed is then subjected to a counter-current depressurisation wherein the pressure in the bed is reduced to the lowest level by releasing gas from the inlet end. This step effects desorption of most of the adsorbed gas from the adsorbent thereby producing a waste gas stream. The level to which the pressure is reduced in the counter-current depressurisation may be atmospheric but can, if desired, be higher, or lower as a result of using a vacuum pump. In a preferred process the final, lowest, pressure is over 1, especially in the range 3 to 5, bar abs. The ratio of the highest pressure, i.e. that at which the raw gas is fed to the adsorber during the adsorption step, to the lowest pressure is preferably in the range 8 to 25, particularly 10 to 15. In the counter-current depressurisation step, the fronts of all three zones move back towards the bed inlet.

After counter-current depressurisation, the bed may, in preferred forms of the process, be subjected to a purge step. In such a step, gas is fed counter-currently through the bed from a bed undergoing co-current depressurisation as described above. Such a purge moves the zones further back towards the bed inlet and further carbon dioxide and nitrogen are carried away through the bed inlet, thus effecting a purge of the bed. During such a purge step the outlet end of the bed adsorbs a significant quantity of nitrogen from the gas being used for the purge and as a result the tail of the front of zone (a) is moved back towards the bed inlet, thus decreasing the risk of trace break-through of carbon dioxide in the next adsorption cycle.

After the counter-current depressurisation step, and after any purge step, the bed is subjected to repressurisation. This is effected counter-currently so that the remaining fronts are moved towards the inlet. The gas used for repressurisation, which may be effected in more than one stage, comprises gas released from the outlet of a bed that has completed its adsorption step, i.e. in a pressure equalisation step as described above. In this step the zone nearest the bed outlet is brought towards equilibrium with the relatively nitrogen-rich gas delivered by the bed undergoing pressure equalisation. During or after the repressurisation using gas from a bed undergoing pressure equalisation, the bed is repressurised, counter-currently, with part of the unadsorbed product stream from a bed undergoing its adsorption step. This feed of product gas to the outlet of the bed undergoing repressurisation preferably takes place throughout the feed of gas from the bed undergoing pressure equalisation as well as after that feed has ceased, so that the flow rate of the product gas from the PSA system as a whole does not vary much with time. Alternatively, or additionally, the product gas feed for repressurisation may be from a product gas reservoir. If desired, nitrogen-rich product gas from the beginning, or the end, of an adsorption step can be used for the repressurisation, rather than using integrated product gas. At the end of repressurisation the bed is ready to return to adsorption duty.

As will be described below, in some cases it is desirable to separate carbon dioxide from the waste gas from the PSA system before the waste gas is used. It is also possible to operate the PSA system to give two waste gas streams, one rich in carbon dioxide, and the other carbon dioxide-lean and containing the bulk of the combustible components, viz carbon monoxide, methane, and hydrogen, separated from the raw gas by the PSA stage. A PSA process giving carbon dioxide-rich and carbon dioxide-lean waste gas streams is described in the aforesaid EP-A-No. 178833 and involves two depressurisation-to-waste stages, the first, preferably co-current, to an intermediate depressurisation pressure and giving the carbon dioxide-lean waste gas and the second, preferably counter-current, to the final, lowest, pressure and giving the carbon dioxide-rich waste gas. Thus where, as is described below, it is desirable to remove carbon dioxide from the waste gas prior to combustion thereof, such a PSA process giving two waste gas streams may be employed and only the carbon dioxide-lean waste gas is subjected to combustion. Alternatively a PSA process giving a single waste gas stream may be used and, where necessary, carbon dioxide is removed therefrom, as described below, prior to combustion.

The adsorbent used in the PSA stage can be chosen from among available materials including varieties of active carbon, zeolites, and silica gel, in respect of which gas adsorption data are published or are available from companies specialising in adsorption. Among the zeolites, those of pore diameter of 5 Å and less, for example calcium zeolite A, are generally useful in view of the small size of the molecules involved. Molecular sieves providing substantially increased adsorption of carbon monoxide relative to nitrogen, for example by a factor of more than ten, such as mordenite or NaCaX, appear to be potentially of value in the present invention but are not normally needed.

In a preferred form of the invention the raw gas is made by reacting a carbonaceous feedstock with steam and an oxygen/nitrogen mixture at superatmospheric pressure using process conditions so as to produce a crude gas in which the molar ratio of the sum of carbon monoxide and hydrogen to nitrogen is in the range 1.2 to 4.0, especially 1.4 to 3.0, and the nitrogen content is at least 5% by volume on a dry basis, then subjecting the crude gas to the catalytic shift reaction with steam to convert carbon monoxide to carbon dioxde plus hydrogen to an extent such that the nitrogen content of the shifted gas is at least ten times the carbon monoxide content by volume, and removing any excess of steam.

Prior to the shift reaction the crude gas preferably has a total carbon oxides content in the range 10 to 25% by volume on a dry basis.

Before the raw gas is subjected to the PSA stage, provision should be made for removing any sulphur compounds that may be introduced with the feedstock. Sulphur compound removal can be applied to the crude gas or to the shifted gas, but, in processes which involve the catalytic reaction of a volatilisable feedstock to produce the crude gas, is preferably applied to the feedstock prior to reaction thereof with steam and the oxygen/nitrogen mixture.

The reaction of the feedstock with steam and the oxygen/nitrogen mixture could in principle be carried out in a single reaction step, but, when catalytic, is preferably carried out in two parts, one involving feedstock and steam, the other involving also oxygen.

In one form of the process, a volatile hydrocarbon feedstock is reacted with steam over a catalyst heated externally (primary reforming) to produce a gas containing carbon oxides, hydrogen, and methane and the resulting gas is reacted with the oxygen/nitrogen mixture adiabatically to convert methane to carbon monoxide and hydrogen and introduce nitrogen (secondary reforming). Such a sequence resembles ammonia synthesis gas generation as used to make a crude gas in which the molar ratio of hydrogen plus carbon monoxide to nitrogen is in the range 2.5 to 3.0, or a lower ratio, e.g. as low as 1.6, as described in U.S. Pat. No. 4,298,588; if desired, the reaction with steam could be carried out by preheating the reactants followed by adiabatic reaction, as described in U.S. Pat. No. 4,303,982.

In a preferred form of the invention, the heat required for the primary reforming reaction is obtained by indirect heat exchange with the hot gas resulting from secondary reforming. A suitable primary reforming reactor configuration for such a process is described in European patent application No. 86301123.5 corresponding to Andrew et al U.S. Ser. No. 06/832425 entitled "Steam reforming hydrocarbons" filed 24 Feb. 1986. It is fortunate that the heat balance of the two reforming stages is such that, when using air as the oxygen/nitrogen mixture, a suitable molar ratio of hydrogen plus carbon monoxide to nitrogen can readily be attained. However the invention includes also the use of moderately enriched air containing up to 35% by volume of oxygen and also the use of oxygen depleted air containing down to 15% by volume of oxygen. Thermodynamic data permitting calculation of temperatures, pressures, and reactants proportions are readily available to chemical engineers.

In another form of the invention the feedstock is methanol and is reacted with steam and air in a single catalytic operation.

The catalytic shift reaction can be carried out in conventional ways, for example:

"high temperature", using an inlet temperature in the range 330° to 400° C., an outlet temperature in the range 400° to 500° C., usually over an iron oxide/chromia catalyst, and affording in a single stage an outlet carbon monoxide content in the range 2 to 4% by volume on a dry basis;

"low temperature", using an inlet temperature in the range 190° to 230° C., an outlet temperature in the range 250° to 300° C., usually over a catalyst comprising metallic copper, zinc oxide, and one or more other difficulty reducible oxides such as alumina or chromia, and affording an outlet carbon monoxide content in the range 0.1 to 1.0, especially under 0.5, % by volume on a dry basis;

"combination", using the sequence of high temperature shift, cooling by indirect heat exchange, and low temperature shift; if desired, either shift stage can be subdivided with interbed cooling.

Alternatively a "medium temperature" shift can be used, in which the inlet temperature is in the range 250° to 325° C. and the outlet temperature is up to 400° C. A suitably formulated supported copper catalyst can be used. The outlet carbon monoxide content is up to 2% by volume on a dry basis.

Whichever shift method is used, it is preferably operated in indirect heat exchange with a coolant, especially water under pressure. Thus the catalyst can be disposed in tubes surrounded by water, or vice versa. Details of such a shift stage are given in EP-A-No. 157480.

If it is desired to produce a technical hydrogen stream of extremely low carbon monoxide content, a further stage of decreasing the carbon monoxide content before the PSA stage can be used: for example there may be an extra step of low temperature shift. However a single stage shift step operated in indirect heat exchange with a coolant, at an outlet temperature in the range 200° to 280° C., is strongly preferred in view of its simplicity and of the overall energy balance of the resulting process.

After shift the gas is cooled, possibly by indirect heat exchange, but preferably, at least in part, by direct contact with water so as to produce a hot water stream suitable for saturating a gaseous feed to the initial reaction of carbonaceous feedstock with steam and the oxygen/nitrogen mixture. Thus where the carbonaceous feedstock is gaseous, e.g. natural gas or naphtha, this may be saturated by direct contact with the hot water stream and so provide at least part of the steam required for the reforming operation. After leaving such a direct contacting with water to effect some cooling, the shifted gas is then cooled by indirect heat exchange to below the dew point of steam to condense any excess of steam as water; this water is then separated, leaving the raw gas ready for feeding to the PSA stage.

Upstream of the PSA stage there may be partial removal of carbon dioxide, especially where the hydrocarbon feedstock has a hydrogen to carbon atomic ratio of less than 3; however such a carbon dioxide removal step prior to the PSA stage is generally unnecessary.

The process steps upstream of the PSA stage are preferably all operated at a pressure above the desired maximum PSA adsorber feed pressure. Alternatively the gas may be compressed to the required PSA inlet pressure an any suitable stage prior to the PSA stage.

In a preferred form of the invention the PSA waste gas is further processed to recover its fuel value. This is preferably effected by combustion and expansion of the combustion products in a turbine, especially driving one or more machines associated with the process. In particular, when the methane content of the raw gas is not over 2% by volume on a dry basis, the power output of such a turbine can be approximately equal to the power requirement of the compressor for the oxygen/nitrogen mixture feeding the reaction of the carbonaceous feedstock of the oxygen/nitrogen mixture. The energy content of the PSA waste gas naturally will also depend on the extent of the shift reaction employed, since that will affect the carbon monoxide content of the PSA waste gas; on the purity of the product stream, since that affects the flow rate of the waste gas relative to the product; and on the waste gas pressure. If a greater power output is required from combustion of the waste gas, for example in order to compress the product gas, the process conditions may be adjusted, for example to give a higher waste gas fuel value. By the term "approximately equal" in relation to the power output and power requirement, we mean that the power output is within ±10% of the power requirement. Thus we do not exclude the possibility of a small import of fuel gas, steam, or electricity to provide additional power for the oxygen/nitrogen mixture compressor, or the export of electricity produced by a generator driven by the turbine. Indeed, it is often preferably to arrange the process conditions to provide such an export of electricity in order to provide the power for auxiliary equipment such as water pumps.

In a preferred form of the invention the PSA waste gas, and/or the air used for its combustion, is saturated by contact with a hot water stream prior to the combustion.

The PSA waste gas has a relatively low calorific value, typically below 300 BTU/scf, i.e. 11 MJ.m$^{-3}$, and, especially where carbon dioxide is not removed therefrom before combustion, may be as low as 20 to 100 BTU/scf, i.e. 0.75 to 3.7 MJ.m$^{-3}$. Combustion of such low calorific value fuels is advantageously effected catalytically. Thus combustion may be effected by passing a mixture of the PSA waste gas and air (one or both of which is preferably saturated with water vapour) over a catalyst such as a supported platinum group metal. In some cases it may be desirable to remove the carbon dioxide from the waste gas prior to combustion.

This may be achieved by a wet carbon dioxide removal process, which may also serve to effect saturation of the gas fed to combustion. Prior to wet carbon dioxide removal and/or combustion, it may be necessary to compress the PSA waste gas. Also the air employed for the combustion will normally require compression. The compressors required for such compressions are conveniently powered by the turbine driven by the waste gas combustion products. The overall process conditions are preferably selected so that the combustion of the PSA waste gas provides that there is approximate equality, as aforesaid, between the power required for compression of the oxygen/nitrogen mixture used in the reaction with the carbonaceous feedstock and the net power obtained by the combustion of the PSA waste gas, i.e. after providing for such compression, if any, of the PSA waste gas and the combustion air. As mentioned above, saturation of the PSA waste gas and/or combustion air is desirable. This saturation may be effected with hot water heated by heat exchange with the combustion products after passage through the turbine.

As mentioned above, in one form of the PSA process, a carbon dioxide-lean waste gas stream at an intermediate pressure can be produced. This may be used directly for combustion thus avoiding the need for compression of the waste gas prior to combustion and/or for carbon dioxide removal therefrom.

Alternatively, or additionally, the fuel value of the PSA waste gas may be utilised in preheating air, steam, or hydrocarbon feedstock used in the crude gas generation steps.

Referring to the process shown, in the drawing desulphurised natural gas is fed, via line 10, to the upper (saturator) section 12 of a tower 14. Here the natural gas contacts a hot water stream, fed to the saturator via line 16, flowing down the packing in the upper section 12. The saturated gas leaves the saturator via line 18 and is then, if steam is available for import, mixed with such imported steam supplied via line 20.

The resultant warm steam/gas mixture, which typically has a steam/gas volume ratio of 2 to 5, a temperature of 150° to 250° C., and a pressure of 25 to 50 bar abs., is then preheated in a heat exchanger 22, typically to 350° C. to 550° C., and fed into annular beds of primary reforming catalyst, typically supported nickel or cobalt, disposed in tubes 24 (only one of which is shown: in practice there will be a large number of such tubes), each having an upper closed end 26, heated in a furnace 28. The resulting hot gas, now typically at 600° C. to 800° C. and containing carbon monoxide, carbon dioxide, hydrogen, unreacted steam, and several percent of methane, passes into the closed end 26 of the tube 24 and returns through an inner tube 30 which is insulated from the bed of reforming catalyst so that there is minimal heat exchange with the reacting gas in the annular catalyst bed.

The primary reformed gas is then fed via line 32 into the uppermost (combustion) section of the furnace 28 where it is mixed, at a burner, with air fed via line 34. A flame is formed and the combustion products are brought towards equilibrium at a lower methane content over a secondary reforming catalyst 36. The resulting secondary reformed gas, now typically at 900° C. to 1050° C., passes passed the tubes 24 and so provides the heat required for the primary reforming occurring therein. In heat exchange with these tubes the secondary reformed gas is cooled, typically to 450° C. to 650° C.

The secondary reformed gas leaves furnace 28 via line 38 and is cooled in heat exchanger 22 and a water heater 40 to the shift inlet temperature. It then passes into a water-cooled shift reactor 42 in which the shift catalyst is disposed in tubes surrounded by water in a pressure shell. In shift reactor 42 the shift reaction is brought substantially to equilibrium at a temperature controlled at typically in the range 230° C. to 280° C. giving an outlet carbon monoxide content in the range 0.1 to 1% by volume on a dry basis. The shift outlet temperature is preferably 10° C. to 30° C. lower than the inlet temperature.

The shifted gas is then cooled in heat exchanger 44, passed into the lower packed de-saturation zone 46 of tower 14 where it contacts cool water fed in via line 48. The resulting water-depleted gas stream leaves desaturator 46 via line 50 and is cooled in cooler 52 to below the dew point of steam and passed into catchpot 54. Here liquid water is separated and removed via line 56 and dry gas is taken overhead via line 58 and passed to a PSA system 60.

PSA system 60 includes beds of adsorbent material such as active carbon or a molecular sieve on which carbon dioxide is strongly adsorbed, hydrogen is very weakly, if at all, adsorbed, and nitrogen, carbon monoxide, methane, and argon, are at least partly adsorbed. The PSA system includes beds under regeneration, i.e. being purged and repressurised, and undergoing treatments such as pressure equalisation and depressurisation as hereinbefore described, and the necessary changeover valves. From the PSA system a technical hydrogen product stream is passed out via line 62 to a user. Also a PSA waste gas stream is passed out via line 64.

The PSA waste gas, which contains nitrogen, carbon dioxide, carbon monoxide, methane, argon, and some hydrogen, is fed via line 64 to a compressor 66 (unless its pressure is already high enough) and then, via line 68, which may include a saturator (not shown), to a catalytic combustor 70 feeding hot gas to a gas turbine 72. The turbine 72 provides shaft power for a two-stage air compressor 74, 76. The low pressure stage 74 of the air compressor supplies air at combustor 70 inlet pressure, and also a feed, via line 78, to the high pressure stage 76 of the air compressor where it is compressed to the process air pressure and fed to the secondary reformer via line 34.

The water system of the process receives cold condensate as the bottoms of catchpot 54 via line 56 and make up water via line 80. This mixture is fed via pump 82 and line 84 into a cool water stream which is then fed via line 48 into the lower (desaturator) packed section 46 of tower 14. Here the unreacted steam in the shifted gas from shift reactor 42 condenses into the water, giving a warm water stream which is taken as bottoms, via line 86, and fed, via pump 88 and line 90, to three heating stages, viz. indirect heat exchange with shifted gas in heat exchanger 44, then, in a heat exchanger 92, with condensing steam raised in shift reactor 42, and then with partly cooled secondary reformed gas in heat exchanger 40. The water stream may then still be entirely liquid or may be partly boiling and is fed, via line 16, to the saturation zone 12 in the upper section of the tower 14. The cooled water remaining after contacting the natural gas in the upper section of tower 14 is fed, via line 94 to a heat exchanger 96 where it is cooled by heat exchange with boiler feed water to be fed to a de-aerator (not shown); the cooled water is then fed, via line 98, to be mixed with cold condensate fed via line 84, and fed to line 48.

In a specific calculated example of the process, 1400 kg mol.h$^{-1}$ of natural gas (calculated as carbon atoms in a mixture of 92.7% by volume methane and 7.3% by volume ethane) are reacted with 3500 kg mol.h$^{-1}$ of steam over the catalyst in tubes 24 and the product of that reaction is reacted with air providing 620 kg mol.h$^{-1}$ of oxygen, brought to reforming equilibrium over catalyst 36, cooled and brought to shift equilibrium at an outlet temperature of 230° C. in reactor 42. Finally the gas is cooled, largely freed of water vapour in catchpot 54, and subjected to PSA separation in the PSA system 60. Table 1 below shows the flow rates, temperatures, and pressures, of the inlet, i.e. raw, gas, product gas, and waste gas of the PSA stage.

TABLE 1

| Stream | Temp. (°C.) | Press. (bar abs) | Flow rate (kg mol · h$^{-1}$) | | | | | |
|---|---|---|---|---|---|---|---|---|
| | | | CO | CO$_2$ | H$_2$ | CH$_4$ | N$_2$ | Ar |
| inlet | 35 | 35 | 25 | 1285 | 4246 | 38 | 2354 | 49 |
| product | 40 | 34 | — | — | 3736 | — | 116 | 34 |
| waste | 30 | 1.5 | 25 | 1285 | 510 | 38 | 2238 | 15 |

The carbon monoxide content of the product was 100 ppm by volume. The hydrogen recovery is 88%. The waste gas has a calorific value of 49.3 BTU/scf (1.84 MJ.m$^{-3}$) and, after catalytic combustion, is in substantial balance with the power requirement of the two stage air compressor 74, 76.

By way of comparison, if pure oxygen instead of air had been used in the secondary reformer, in order to achieve a carbon monoxide content of 100 ppm by volume in the technical hydrogen product stream from the PSA system, to give the same amount (3736 kg mol.h$^{-1}$) of hydrogen product, the hydrogen recovery would be between 80 and 85%.

Table 2 below shows, for the same inlet gas compositions employed in the example in Table 1, the effect on the hydrogen recovery, and on the carbon monoxide content of the product, of operating the PSA to give different proportions of nitrogen in the unadsorbed product stream.

TABLE 2

| Impurity content in product (by volume) | | H$_2$ recovery % |
|---|---|---|
| N$_2$ (%) | CO (ppm) | |
| 0.5 | 20 | 81 |
| 1 | 40 | 83.5 |
| 2 | 70 | 86 |
| 3 | 100 | 88 |
| 5 | 170 | 88.5 |
| 8 | 270 | 89 |
| 10 | 340 | 89.2 |

Table 3 shows the effect of the ratio (R) of hydrogen to the sum of nitrogen and carbon nonoxide at a constant nitogen: carbon nonoxide ratio of about 94 in the raw gas on the hydrogen recovery to give a product gas containing 3% by volume of nitrogen and a carbon monoxide content of about 100 ppm by volume.

TABLE 3

| R | Hydrogen recovery (%) |
|---|---|
| 1.2 | 85 |
| 1.8 | 88 |
| 4.0 | 90 |

I claim:

1. A pressure swing adsorption (PSA) process for producing a technical hydrogen stream comprising
   (a) feeding to the PSA adsorbent a raw gas containing hydrogen, nitrogen, and carbon oxides, wherein the volume ratio of hydrogen to the sum of nitrogen and carbon monoxide is in the range 1.2 to 4.0 and the nitrogen content by volume is at least ten times the carbon monoxide content, and
   (b) stopping the adsorption step in the PSA cycle when the integrated nitrogen content of the unadsorbed product gas of the PSA stage is in the range 1 to 10% by volume.

2. A process according to claim 1 wherein the integrated nitrogen content of the product gas is at least 2% by volume.

3. A process according to claim 1 wherein the nitrogen/carbon monoxide volume ratio of the raw gas is at least 20.

4. A process according to claim 1 wherein the raw gas contains less than 2% by volume of methane.

5. A process according to claim 1 wherein the volume ratio of nitrogen plus carbon monoxide to carbon dioxide in the raw gas is in the range 0.6 to 4.

6. A process according to claim 1 wherein the raw gas is made by reacting a carbonaceous feedstock with steam and an oxygen/nitrogen mixture at superatmospheric pressure using process conditions so as to produce a crude gas in which the molar ratio of the sum of carbon monoxide and hydrogen to nitrogen is in the range 1.2 to 4.0 and the nitrogen content is at least 5% by volume on a dry basis, then subjecting the crude gas to the catalytic shift reaction with steam to convert carbon monoxide to carbon dioxide plus hydrogen to an extent such that the nitrogen content of the shifted gas is at least ten times the carbon monoxide content by volume, and removing any excess of steam.

7. A process according to claim 6 wherein the carbonaceous feedstock is reacted with steam in a primary reforming step by passing the feedstock/steam gas stream over a catalyst disposed in tubes heated in a furnace and the resultant primary reformed gas is reacted with the oxygen/nitrogen mixture in a secondary reforming step to produce a secondary reformed gas and said tubes being heated by the secondary reformed gas.

8. A process according to claim 6 wherein the shift reaction is conducted under such conditions that the carbon monoxide content of the shifted gas is less than 1% by volume.

9. A process according to claim 6 wherein at least part of the waste gas from the PSA stage is combusted with air and the combustion products thereof power a turbine driving the compressor for the oxygen/nitrogen mixture.

* * * * *